United States Patent
Pellegrini

(10) Patent No.: US 11,808,378 B2
(45) Date of Patent: Nov. 7, 2023

(54) GLOBE VALVE ASSEMBLY

(71) Applicant: Michael Pellegrini, Westfield, MA (US)

(72) Inventor: Michael Pellegrini, Westfield, MA (US)

(*) Notice: Subject to any disclaimer, the term of this patent is extended or adjusted under 35 U.S.C. 154(b) by 0 days.

(21) Appl. No.: 17/716,245

(22) Filed: Apr. 8, 2022

(65) Prior Publication Data
US 2022/0325804 A1 Oct. 13, 2022

Related U.S. Application Data

(60) Provisional application No. 63/174,092, filed on Apr. 13, 2021.

(51) Int. Cl.
| F16K 3/24 | (2006.01) |
| F16K 1/42 | (2006.01) |
| F16K 5/04 | (2006.01) |
| F16K 27/06 | (2006.01) |
| F16K 1/48 | (2006.01) |
| F16K 31/50 | (2006.01) |
| F16K 1/10 | (2006.01) |

(52) U.S. Cl.
CPC .............. *F16K 5/0435* (2013.01); *F16K 1/10* (2013.01); *F16K 1/427* (2013.01); *F16K 1/482* (2013.01); *F16K 3/246* (2013.01); *F16K 5/0464* (2013.01); *F16K 27/065* (2013.01); *F16K 31/508* (2013.01)

(58) Field of Classification Search
CPC .......... F16K 27/065; F16K 1/10; F16K 1/427; F16K 1/48–485; F16K 31/508; F16K 3/246; F16K 47/08
See application file for complete search history.

(56) References Cited

U.S. PATENT DOCUMENTS

| 3,326,513 A | * | 6/1967 | Hall | ........................ F16K 1/482 |
| | | | | 251/86 |
| 3,599,934 A | * | 8/1971 | Reed | ....................... F16K 25/00 |
| | | | | 251/303 |
| 3,700,206 A | * | 10/1972 | Jones | ...................... F16K 1/482 |
| | | | | 251/297 |

(Continued)

FOREIGN PATENT DOCUMENTS

| CN | 110671506 A | * | 1/2020 |
| DE | 102015011551 B3 | * | 3/2017 |

(Continued)

*Primary Examiner* — Marina A Tietjen
(74) *Attorney, Agent, or Firm* — Doherty Wallace Pillsbury Murphy

(57) ABSTRACT

A valve assembly for controlling a flow of a substance through the valve assembly includes a valve body defining an inlet, an outlet, and a volume therebetween and a sleeve disposed in at least a portion of the volume, an interior of the sleeve having a first opening in fluid communication with the inlet and a second opening in communication with the outlet. The valve assembly also includes a seat ring releasably held in place in the valve body by the sleeve at at least one of the first opening or the second opening. The valve assembly further includes a stem disposed in the sleeve and a plug releasably engaged to the stem and configured to contact the seat ring to control the flow of the substance through the valve assembly.

18 Claims, 8 Drawing Sheets

(56) References Cited

U.S. PATENT DOCUMENTS

| | | | | |
|---|---|---|---|---|
| 4,264,053 A | * | 4/1981 | Carlson | F16K 1/482 |
| | | | | 251/264 |
| 4,469,123 A | * | 9/1984 | Merrill | F16K 43/00 |
| | | | | 137/454.6 |
| 2010/0307610 A1 | * | 12/2010 | Wears | F16K 25/04 |
| | | | | 137/454.6 |
| 2017/0184219 A1 | * | 6/2017 | Braeuer | F16K 3/32 |
| 2018/0112799 A1 | * | 4/2018 | Eilers | F16K 47/08 |
| 2018/0112800 A1 | * | 4/2018 | Griffin, Jr. | F16K 47/08 |
| 2018/0216745 A1 | * | 8/2018 | Gabriel | F16K 1/465 |
| 2018/0340616 A1 | * | 11/2018 | McCarty | F16K 1/42 |
| 2019/0211934 A1 | * | 7/2019 | Hammond | F16K 21/02 |
| 2019/0234519 A1 | * | 8/2019 | Merscher | F16K 5/204 |
| 2019/0353265 A1 | * | 11/2019 | Gabriel | F16K 27/00 |
| 2019/0378436 A1 | * | 12/2019 | Krummenacher | G09B 23/30 |
| 2022/0316601 A1 | * | 10/2022 | Stednitz | F16K 1/46 |

FOREIGN PATENT DOCUMENTS

| | | | | |
|---|---|---|---|---|
| DE | 202021102471 U1 | * | 9/2021 | F16K 1/52 |
| WO | WO-2013039779 A1 | * | 3/2013 | B65D 90/623 |

\* cited by examiner

GLOBE VALVE ASSEMBLY

CROSS-REFERENCE TO RELATED APPLICATION

This application claims the benefit of an earlier filing date from U.S. Provisional Application Ser. No. 63/174,092 filed Apr. 13, 2021, the entire disclosure of which is incorporated herein by reference

BACKGROUND

High pressure valves in power plants operate under very severe conditions. The valves are subject to high pressure blowdown of steam that often is abrasive because of the presence in the steam of moisture droplets and solid particulates. Further, the valves operate with fluid medium typically of very high temperatures, on the order of 660 degrees Fahrenheit in the case of saturated steam and 1020 degrees Fahrenheit in the case of superheated stream. Pressures of 2300 pounds per square in gauge ("psig"), or thereabouts, are common, and pressures of 3800 psig, or more, are encountered in some super critical steam power plants. Such valves historically have been forged steel globe valves with integral hard-faced metal seats. In the operation of such valves, extreme variations in temperature often lead to "cooling" of the disk and valve stem, resulting in contraction of the stem. Such contraction often causes the disk to part from the seat, permitting fluid to bleed through the valve.

Further, in high temperature service, stress-relaxation of stems in closed valves may produce a loss of stem compression and similar bleeding past the seat.

Still further, when the seating surfaces have become damaged over time, the valves have simply been replaced. Periodic replacement of such valves generally has been an accepted requirement by high pressure steam power plant operators.

In the art, there are globe valves constructed with integral seat assemblies which require the entire valve to be machined to repair a faulty seat assembly.

Accordingly, there is a need for a globe valve which has superior functional capabilities while allowing for easy and thus cost effective replacement of the disk and seat assembly.

SUMMARY

An object of the invention is, therefore, to provide a globe valve suitable for use in a range of applications including but not limited to drains and vents and high pressure steam. In particular, the globe valve will ensure secure sealing performances in the event of thermal contraction or stress reduction of the valve stem.

A still further object of the invention is to provide a valve having replaceable disk and seat assemblies, wherein the replaceable assemblies provide a sealing performance comparable to the sealing performance of the original disk and seat.

A still further object is to provide such a globe valve which may be assembled in an economical manner so as not to force an undue cost premium over the traditional valves with integral hard-faced metal seats.

A still further object is to provide a method for making a globe valve having the improvements above described.

To achieve these objects, an exemplary globe valve assembly comprises a stem separately formed from a plug, wherein the stem and the plug are actuated via a specially designed actuating subassembly. The stem and plug are positioned within the assembly to thereby allow for separate maintenance and/or replacement of the stem and the plug. The globe valve assembly further comprises a sleeve that is in communication with the stem and the plug and which holds a seat ring. Unlike the prior art, the seat ring disclosed herein is not molded to the main valve body, but rather is held in place by the sleeve such that the seat ring may be removed for repair or replacement should it be damaged or otherwise need replacing.

Disclosed is a valve assembly for controlling a flow of a substance through the valve assembly. The valve assembly includes: a valve body defining an inlet, an outlet, and a volume therebetween; a sleeve disposed in at least a portion of the volume, an interior of the sleeve having a first opening in fluid communication with the inlet and a second opening in communication with the outlet; a seat ring releasably held in place in the valve body by the sleeve at at least one of the first opening or the second opening; a stem disposed in the sleeve; and a plug releasably engaged to the stem and configured to contact the seat ring to control the flow of the substance through the valve assembly.

Also disclosed is a method for controlling a flow of a substance through a valve assembly. The method includes: flowing the substance through the valve assembly, the valve assembly comprising: a valve body defining an inlet, an outlet, and a volume therebetween; a sleeve disposed in at least a portion of the volume, an interior of the sleeve having a first opening in fluid communication with the inlet and a second opening in communication with the outlet; a seat ring releasably held in place in the valve body by the sleeve at at least one of the first opening or the second opening; a stem disposed in the sleeve; and a plug releasably engaged to the stem and configured to contact the seat ring; and at least one of: (i) rotating the stem in one direction to force the plug against the seat ring to stop the flow of the substance through the valve assembly or (ii) rotating the stem in an opposite direction to unseat the plug from the seat ring to allow the flow of the substance through the valve assembly.

The above and other features of the invention, including various novel details of construction and combinations of parts, will now be more particularly described with reference to the accompanying drawings. It will be understood that the particular devices and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A first embodiment of the present invention is shown in a globe valve assembly 1 depicted in FIGS. 1-7. For the purposes of the following description, the upper end of valve assembly 1 is considered to be towards the top of FIG. 1, and the lower end towards the bottom of FIG. 1.

Referring to FIGS. 1-7, globe valve assembly 1 comprises an actuating subassembly 10. Actuating subassembly 10 comprises an upper mounting flange 12 and a lower mounting flange 13.

Figure 1:
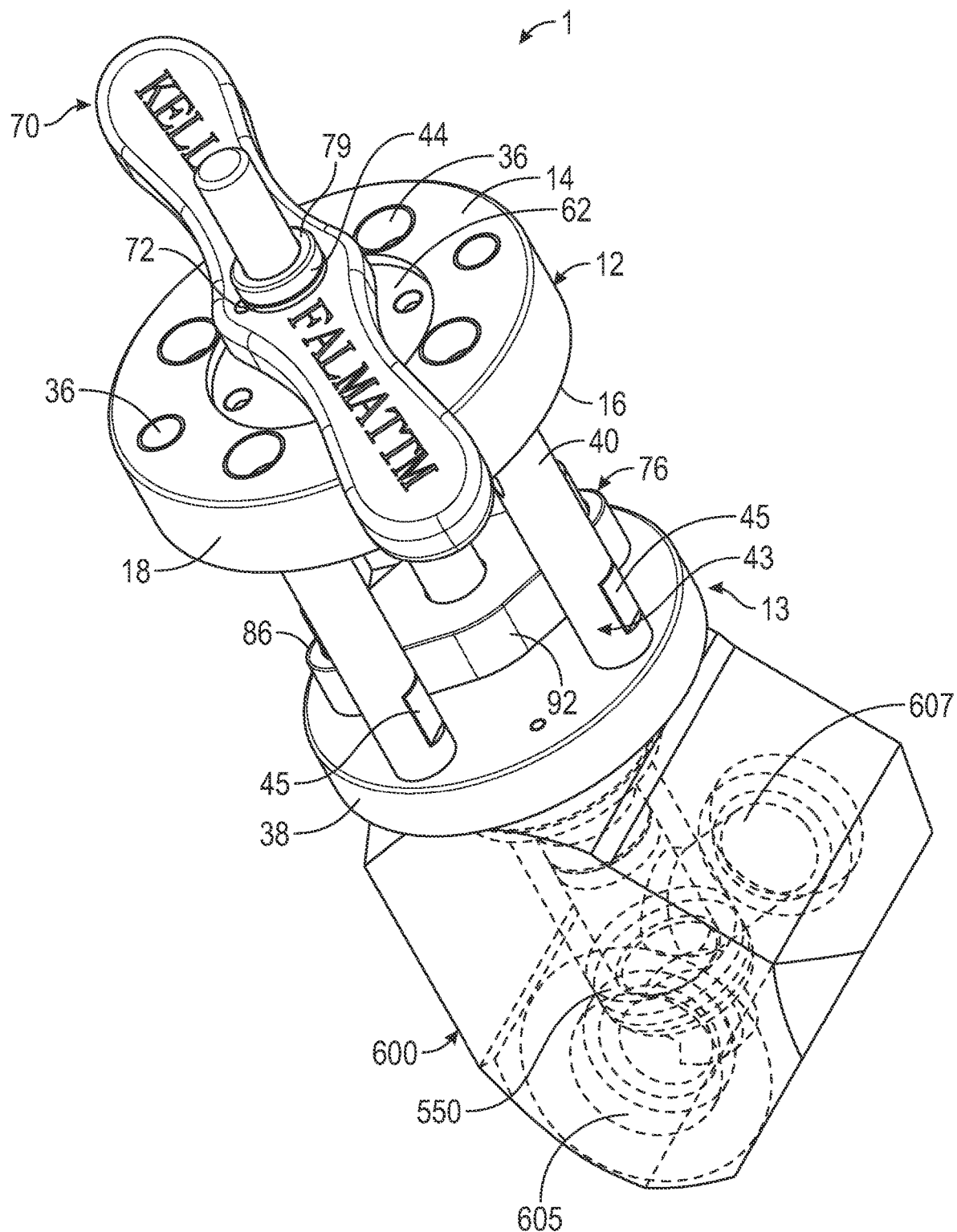
FIG. 1 is a schematic depicting a top perspective view of an exemplary globe valve assembly.
Figure 2:
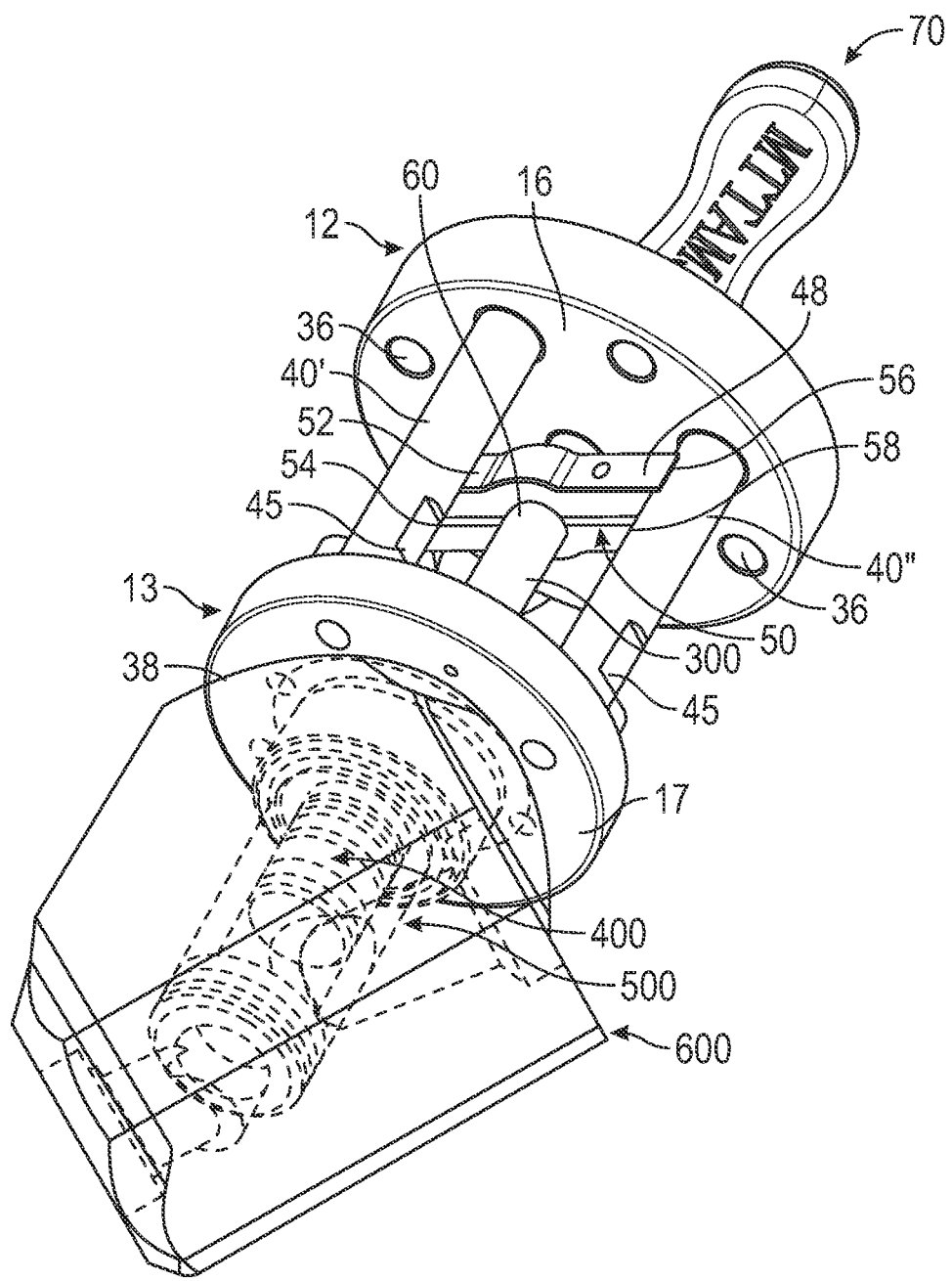
FIG. 2 is a schematic depicting a bottom perspective view of the globe valve assembly depicted in FIG. 1.
Figure 3:
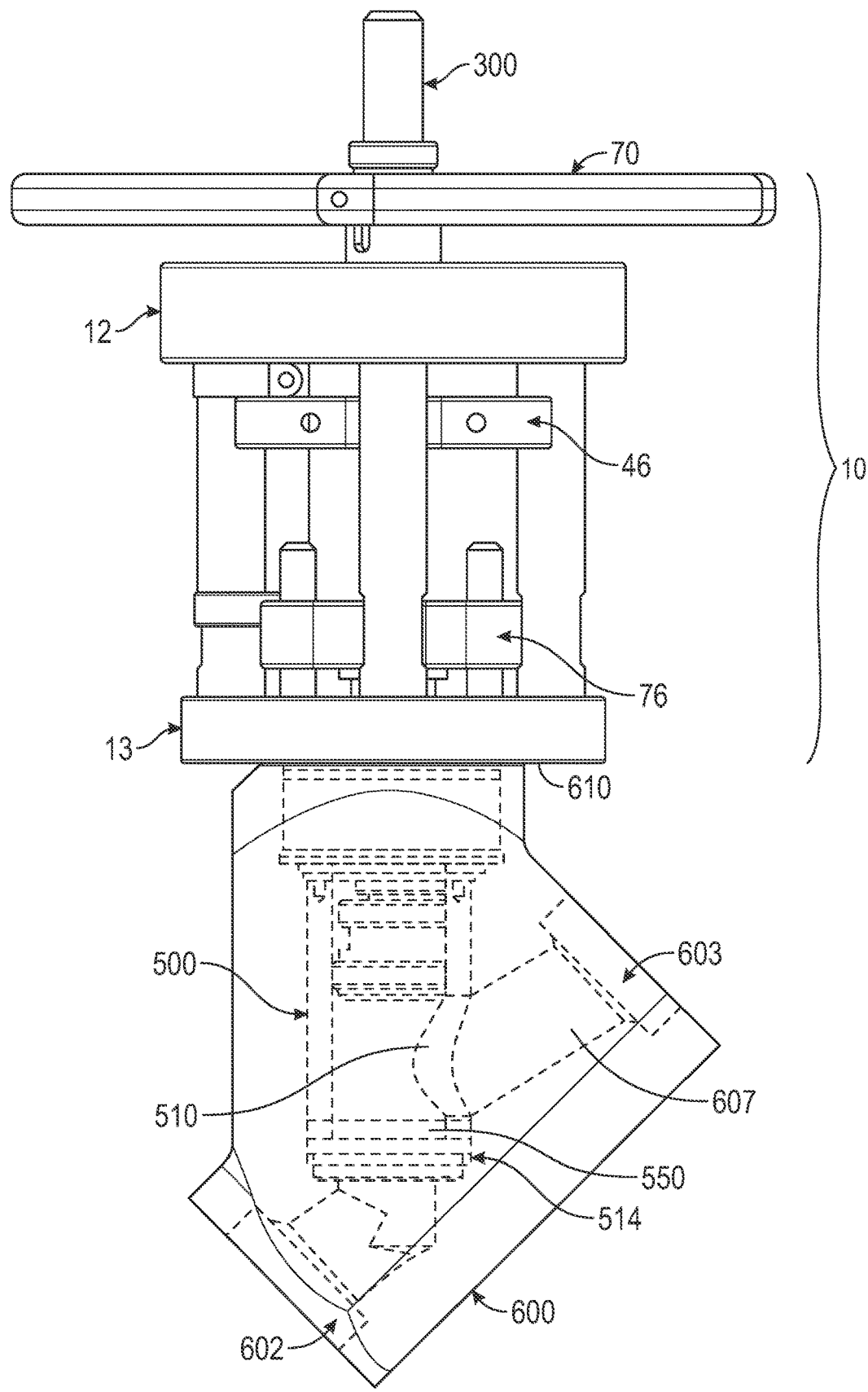
FIG. 3 is a schematic depicting a side view of the globe valve assembly depicted in FIGS. 1 and 2.
Figure 4:
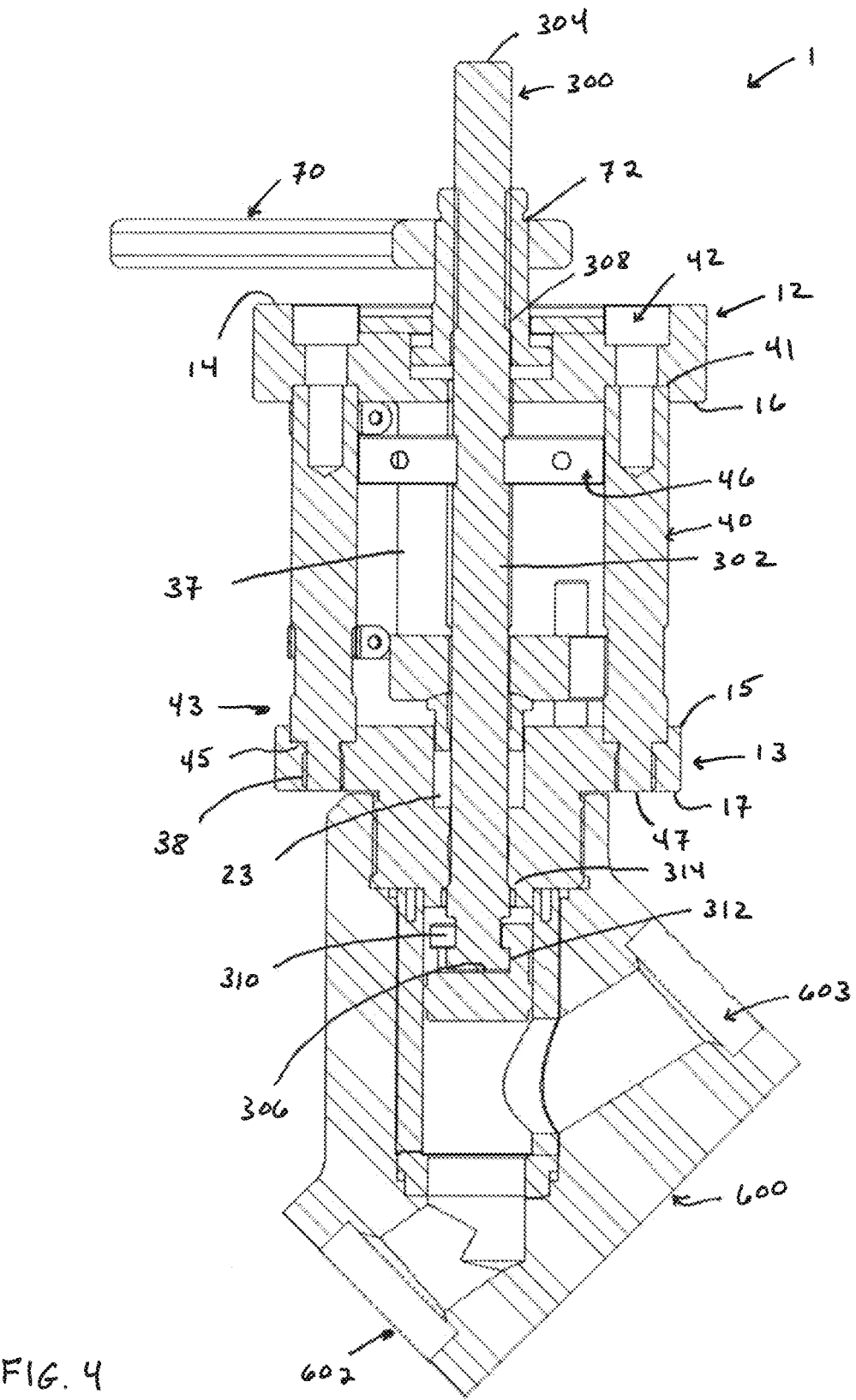
FIG. 4 is a schematic depicting a longitudinal sectional view of the globe valve assembly depicted in FIGS. 1-3.
Figure 5:
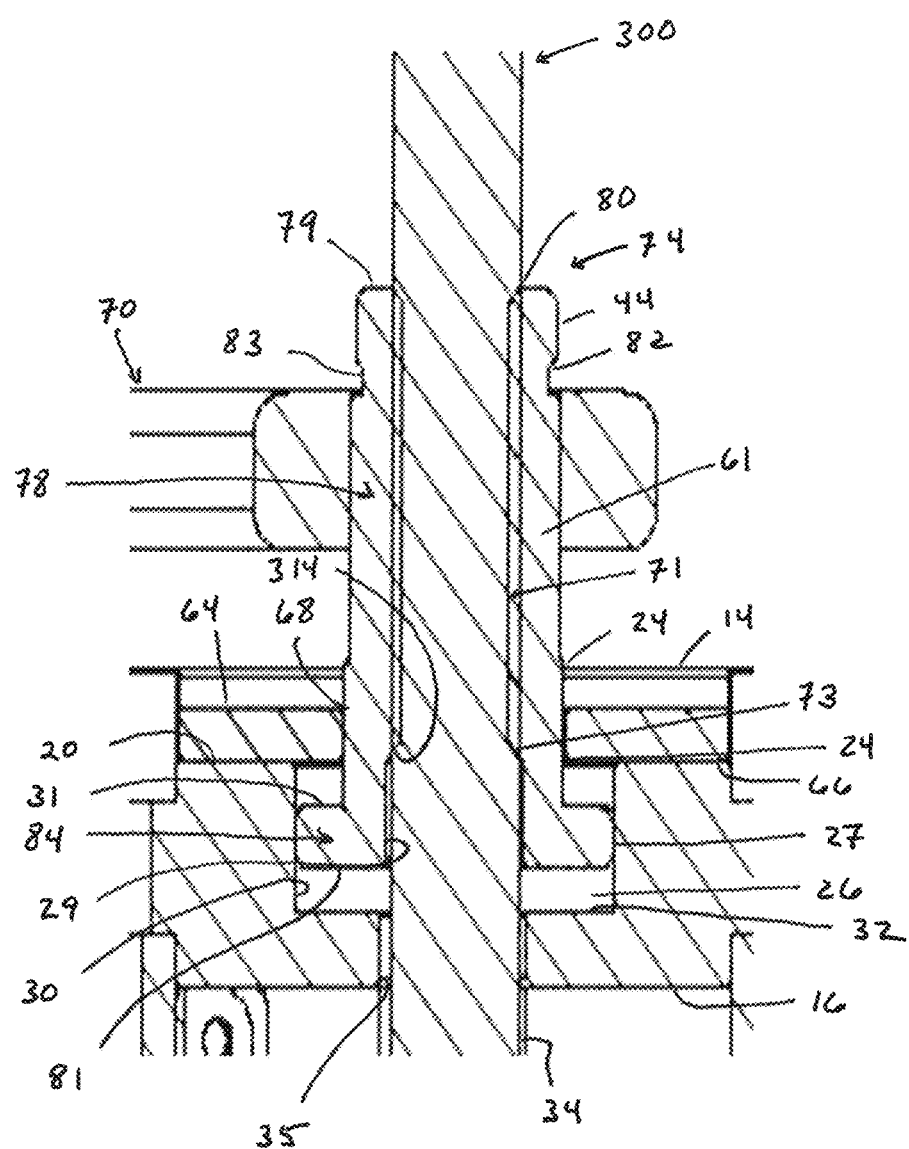
FIG. 5 is a schematic depicting an upper section of the assembly depicted in FIG. 4.

Upper mounting flange 12 has an upper face 14 oppositely situated to a lower face 16, wherein upper face 14 is joined to lower face 16 via a side wall 18. As best shown in FIGS. 4 and 5, at a centrally formed portion of upper face 14, upper face 14 turns towards lower face 16 to form a recessed wall 20 which is surrounded by an interior directed side wall 22. An opening 24 is centrally formed through recessed wall 20. Opening 24 leads into a pocket 26 which is defined by an interior-directed side wall 30 and a lower interior wall 32. Pocket 26 is continuously formed with a channel 34 which extends into an opening 35 formed in lower face 16 of upper mounting flange 12.

As best shown in FIGS. 1-4 and 6, lower mounting flange 13 has an upper face 15 oppositely situated to a lower face 17, wherein upper face 15 is joined to lower face 17 by a side wall 19. An opening 21 is centrally formed through upper face 15 and longitudinally extends through side wall 19 to form a chamber 23, wherein chamber 23 is surrounded by an interior wall 25 of side wall 19.

Upper mounting flange 12 has a plurality of bores 36 that are respectively formed through upper and lower faces 14 and 16, and lower mounting flange 13 has a plurality of bores 38 respectively formed through upper and lower faces 15 and 17, wherein the bores from plurality 36 are aligned with the bores from plurality 38. The bores from plurality 38 are substantially T-shaped to thereby create a seat 39 as best shown, e.g., in FIG. 7.

A plurality of posts 40 is disposed between upper and lower mounting flanges 12 and 13. An upper terminal end 41 of each post from plurality 40 is disposed within a bore from plurality 36. A lower terminal end 43 of each post from plurality 40 has an indent 45 formed thereon. A bottom side 47 of indent 45 sits on seat 39 of a bore from plurality 38 which is aligned with the bore from plurality 36. The posts of plurality 40 are secured to upper mounting flange 12 via bolts 42 which are driven through bores from plurality 36.

The plurality of posts 40 are arranged to form an opening 37 which is surrounded by plurality of posts 40 and which separates adjacently situated posts 40. Each of the posts of plurality 40 has the indent 45 formed thereon towards lower terminal end 43 thereof.

Actuating subassembly 10 further comprises a clamp member 46 having a first member 48 and a second member 50. Each of first and second members 48 and 50 comprises a respective anterior terminal end 52 and 54 oppositely situated to a posterior terminal end 56 and 58. In an exemplary embodiment, when clamp member 46 is attached to actuating subassembly 10, anterior terminal ends 52 and 54 are secured to a post 40' of plurality 40 and posterior terminal ends 56 and 58 are secured to a post 40" of plurality 40 to thereby form an opening 60 which is centrally positioned between first and second members 48 and 50 of clamp member 46 and which is coaxial with channel 34.

Actuating subassembly 10 further comprises a plate 62. Plate 62 is positioned within opening 24 of upper mounting flange 12 and is secured therein via screws. In an exemplary embodiment, plate 62 comprises a top side 64 oppositely situated to a bottom side 66, wherein an opening 68 is centrally formed through top and bottom sides 64 and 66. Bottom side 66 rests on recessed wall 20 of upper mounting flange 12 such that opening 68 is aligned with opening 24 and channel 34 and such that bottom side 66 forms an upper border for pocket 26.

Actuating subassembly 10 further comprises a handle 70 which has an opening 72 centrally formed therethrough. It can be appreciated that element number 70 can represent any motive interface or motive power for operating the valve assembly 1. For example, the handle 70 may be used to manually operate the valve assembly 1. In another embodiment, the element number 70 can be a motor for operating the valve assembly 1 as a motor-operated valve or remotely-operated valve.

Actuating subassembly 10 further comprises an upper stem receiving member 74, an intermediate stem receiving member 76, and a lower stem receiving member 94.

As best shown, e.g., in FIG. 5, upper stem receiving member 74 comprises a body 78 having a top side 79 oppositely situated to a bottom side 81, wherein top side 79 is joined to bottom side 81 by a side wall 61. An opening is formed on top side 79 and an opening is formed on bottom side 81, and a channel 80 longitudinally and continuously extends from the openings of top and bottom sides 79 and 81. Channel 80 is surrounded by an interior wall 71 of body 78, wherein interior wall slopes to form a shoulder 73. Body 78 has a detent 82 formed in an upper portion thereof to form a collar 83. Body 78 further has a flange element 84 having as its lower boundary bottom side 81 and being further defined by an exterior side wall 27, an interior side wall 29, and a top side 31.

When globe valve assembly 1 is assembled, upper stem receiving member 74 is arranged such that flange element 84 is contained within pocket 26 of upper mounting flange 12 such that top side 31 of flange element 84 is oriented towards bottom side 66 of plate 62, and such that exterior side wall 27 of flange element 84 is oriented towards interior directed side wall 22 of upper mounting flange 12, and bottom side 81 of upper stem receiving member 74 is oriented towards lower interior wall 32 of upper mounting flange 12. Additionally, opening 72 of handle 70 is disposed over collar 83 of upper stem receiving member 74 and secured thereto via a top portion 44. In an exemplary embodiment upper stem receiving member 74 comprises a stem nut.

Figure 6:
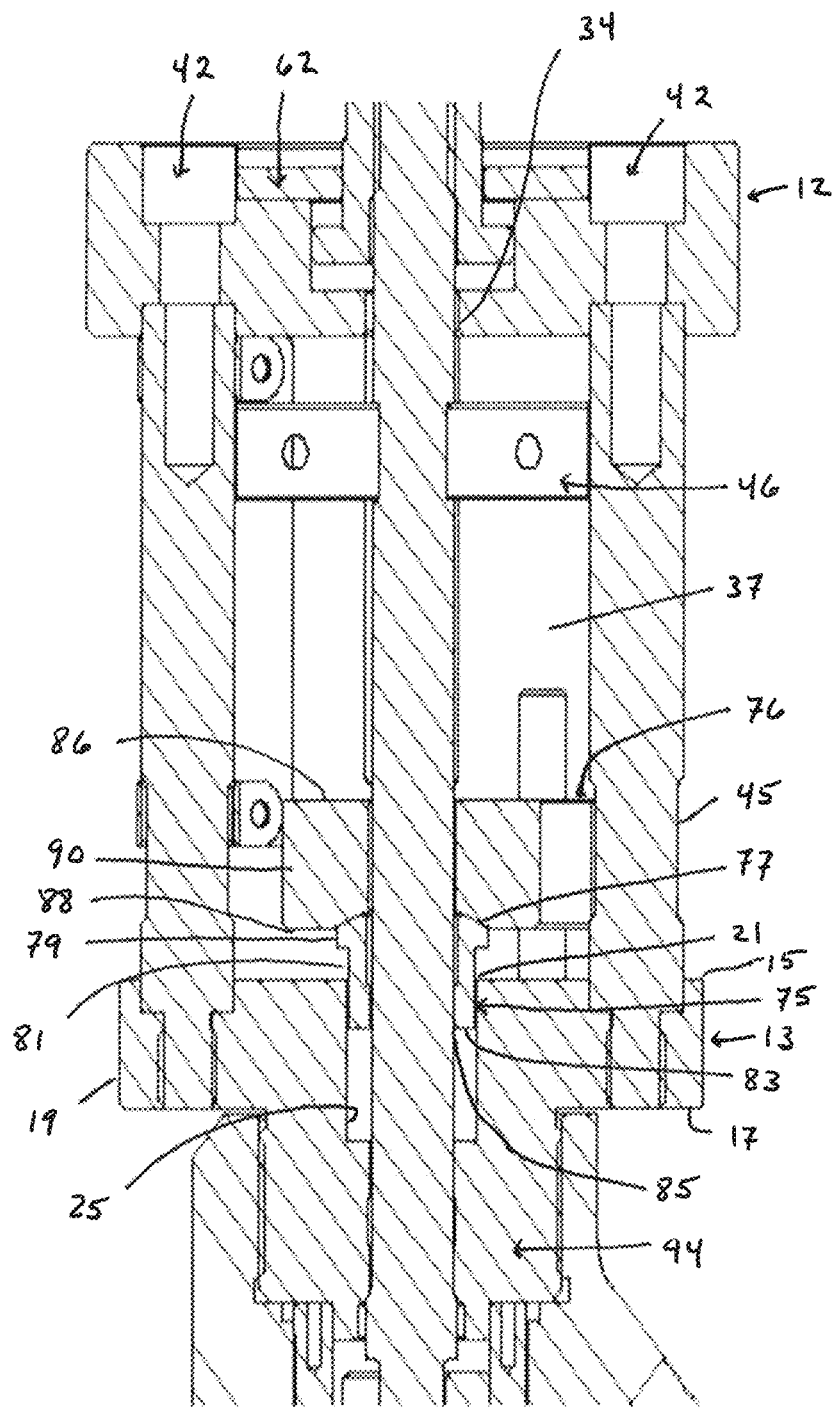
FIG. 6 is a schematic depicting a middle section of the assembly depicted in FIG. 4.

Intermediate stem receiving member 76, which is best depicted, e.g., at FIG. 6, has a top face 86 oppositely situated to a bottom face 88, and a side wall 90 that joins top face 86 to bottom face 88. Side wall 90 has a series of alternating ridges and grooves 92 formed thereon. In an exemplary embodiment, intermediate stem receiving member 76 comprises a packing gland.

Intermediate stem receiving member 76 further has an engagement element 75 having a top side 77 that is integrally formed with bottom face 88. Top side 77 turns inwardly to form a flange 79. Flange 79 turns downwardly to form a neck region 81. Openings are formed on top face 86, bottom face 88, top side 77 and a bottom side 83 of neck region 81, wherein the openings lead into a channel 85 that is continuously formed through intermediate stem receiving member 76.

Figure 7:
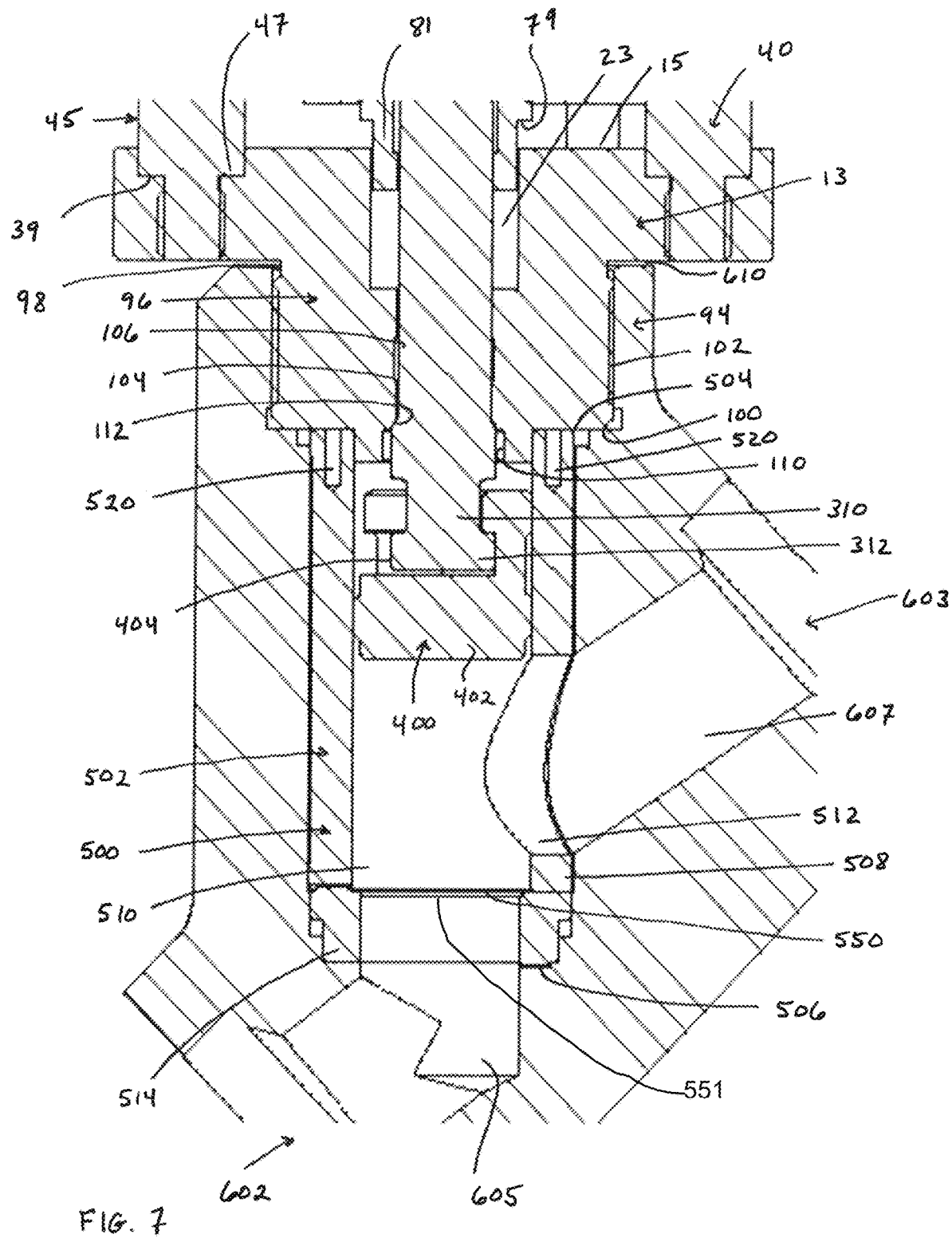
FIG. 7 is a schematic depicting a lower section of the assembly depicted in FIG. 4.

The lower stem receiving member 94, which is best depicted at, e.g., FIG. 7, comprises a body 96 having a top side 98 that is contiguously formed with lower face 17 of lower mounting flange 13. Body 96 further comprises a bottom side 100 which is joined to top side 98 by a side wall 102. Top side 98 has an opening centrally formed thereon wherein opening leads into chamber 23 of lower mounting flange 13 on one side thereof, and into a channel 104 on an opposite side thereof, wherein channel 104 has a diameter that is narrower than a diameter of chamber 23. An interior wall 106 of side wall 102 surrounds channel 104. A posterior terminal end 108 of interior wall 106 has an indent 110 formed therein to form a shoulder 112.

When assembled, intermediate stem receiving member 76 is disposed within opening 37 such that top face 86 of intermediate stem receiving member 76 is oriented towards upper mounting flange 12 and bottom side 83 of neck region 81 of engagement element 75 is oriented towards the lower stem receiving member 94. Neck region 81 is positioned within chamber 23. Movement of engagement element 75 further down chamber 23 is impeded via the interaction of flange 79 with upper face 15 of lower mounting flange 13.

In addition to actuating subassembly 10, globe valve assembly 1 comprises a stem 300, a plug 400, a sleeve 500, and a main valve body 600.

The stem 300 comprises a substantially longitudinally extending body 302 comprising an anterior terminal end 304 oppositely situated to a posterior terminal end 306. As best shown in, e.g., FIGS. 4 and 5, the body 302 comprises an upper shoulder 308 towards anterior terminal end 304. Posterior terminal end 306 of the body 302 turns outwards to form an abutment 314, which then turns downwards to form an intermediate shoulder 316, which then turns inwards to form a neck region 310 (i.e., a cylindrical recess) which then turns outwards to form a lower shoulder 312.

Body 302 is disposed through opening 72 of handle 70, and through openings 24 and 35 of upper mounting flange 12, opening 21 of lower mounting flange 13, opening 37, opening 60 of clamp member 46, and opening 68 of plate 62, and through channels 80, 85, and 104 such that upper shoulder 308 of stem 300 abuts shoulder 73 of upper stem receiving member 74, such that abutment 314 of stem 300 abuts shoulder 112 of the lower stem receiving member 94, and such that a space is created between indent 110 of the lower stem receiving member 94 and the intermediate shoulder 316.

The plug 400 comprises a body 402 that is configured to engage with the neck region 310 (i.e., the cylindrical recess) and lower shoulder 312 of stem 302. To that end, body 402 has a substantially inverted T-shaped opening 404 centrally formed through a top side 406 of the body 402, wherein the opening 404 receives the stem 300. The stem 300 is releasably engaged from the plug 400 which allows for the easy replacement or repair of a damaged stem 300 or a damaged plug 400 without the need of replacing both the stem and the plug. In an exemplary embodiment, the plug 400 slides off of the end of the stem 300. In one or more embodiments, the plug 400 slides horizontally off the end of the stem 300 when the stem 300 is in a vertical orientation. In one or more embodiments, the plug 400 interlocks with the stem 300 and is not secured to the stem 300 by a mechanical fastener such as a threaded fastener (e.g., bolt or screw).

The sleeve 500 comprises a body 502 having an open-ended top side 504 oppositely situated to an open-ended bottom side 506 and joined thereto by a side wall 508. Open-ended top side 504 is secured to bottom side 100 of lower stem receiving member 94 via, e.g., dowels 520 such that open-ended bottom side 506 is directed away from actuating subassembly 10. A chamber 510 is formed between top and bottom sides 504 and 506, and an opening 512 is formed through side wall 508, wherein opening 512 is in fluid communication with chamber 510. When assembly 1 is assembled, posterior terminal end 306 of stem 300 and body 402 of plug 400 is contained within chamber 510 of sleeve. Assembly 1 further comprises a seat ring 550 that is held in place at a threaded portion 514 of the body 502, wherein the seat ring 550 is disposed below the opening 512. In one or more embodiments, a seal 551 (or seal ring having geometry matching the seat ring) made of a compliant material (e.g., rubber, silicone, neoprene) is disposed between the seat ring 550 and the threaded portion 514 such that as the body 502 presses against the seat ring 550, the seat ring 550 in turn compresses the seal 551 to seal the seat ring 550 to the threaded portion 514. In an alternative embodiment, the threaded portion 514 represents a portion of the main valve body 600 such that as the body 502 presses against the seat ring 550, the seat ring 550 in turn compresses the seal 551 to seal the seat ring 550 to the portion of the main body represented by element number 514. Hence, replacement of the seat ring 550 includes removal of the sleeve 500, which removes pressure on the seat ring 550 to allow the seat ring 550 to be removed from the inside of the valve body 600. Then a new seat ring 550 (and optionally a new seal 551) can be inserted into the portion 514 either in the sleeve body 502 or the main valve body 600. Installation of the sleeve 500 thus applies pressure on the seat ring 550 and seal to hold the seat ring 550 and seal 551 in place. In one or more embodiments, the seat ring 550 is not secured to the portion 514 of the sleeve body 502 or the valve body 600 by a threaded coupling or by a mechanical fastener such as a threaded fastener (e.g., bolt or screw).

The seat ring 550 and plug 400 act as a seat in the valve assembly. The seat stops the passage of water, steam, air or fluid or substance of interest from passing through the valve assembly when the valve assembly is in a closed configuration. Seats are surfaces that seal, which include a seat ring and a plug. In one or more embodiments, the seating surface on the seat ring has a 30-degree angle on the inside edge of the seat ring. The seating surface on the plug also has a 30-degree angle near the outside diameter of the plug to engage the seat ring.

The main valve body 600 comprises a valve inlet 602 and a valve outlet 603. When globe valve assembly 1 is in an open position, valve inlet 602 and outlet 603 are in fluid communication with each other via passageways in valve body 600. An upstream chamber 605 is formed in body 600 and is in fluid communication with valve inlet 602. A downstream chamber 607 is formed in body 600 and is in fluid communication with valve outlet 603. An open-ended top side 610 of main valve body 600 is attached to lower mounting flange 13 via a threaded engagement therewith such that body 96 of lower stem receiving member 94 is contained within chamber 510 of sleeve 500 and such that upstream chamber 605 and downstream chamber 607 are in fluid communication with chamber 510 of sleeve 500.

Valve operation for a manually operated valve assembly is now discussed. In one or more embodiments, the handle is turned in a clockwise direction to close the valve, the handle is attached to the stem nut, the stem nut has threads on the inside of it. The stem has threads on the outer diameter which is threaded through the inside diameter of the stem nut as the handle and stem nut turn the threads in the stem nut. The plug is attached to the stem so the turning of the handle in the clockwise direction pushes the plug into the seat ring. Once the plug and the seat ring touch additional force may be put on the handle to seat the two surfaces together and create a seal.

The valve assembly disclosed herein provides several advantages relating to ease of maintenance and repairability. If a valve leaks it can cause significant efficiency loss which translates to money loss. In addition it could create a hazardous situation where someone could get injured. Some valves leak within a few months and have to be repaired once a year or even sooner. The valve assembly disclosed herein is easily repairable because the plug and seat ring which are the two surfaces that need to seal can be removed by simply lifting the seat ring out and sliding the plug off of the stem. All of the prior art valves in the market currently weld Stellite into the body and the seat is permanently part of the body and cannot be removed. Most globe valves manufactured now also have the stem and plug as an assembly and cannot be separated. Most prior art globe valves are constructed with low cost as the main design factor, so sub-assemblies, castings and forgings are used that are not easily repairable. In addition, the manufacturers of prior art valves are hoping a damaged valve will be replaced instead of being repaired to increase revenue. Another advantage of the valve assembly disclosed herein is that the actuator plate can be removed with four bolts to accommodate a wide variety of actuators that may be available in the market.

Further to the above, all prior art globe valves manufactured have an integral seat which is welded into the valve body. All valves have been shown to leak over time. This means these valves need to be repaired very frequently. With current prior art globe valve designs the repair company needs to make a custom tool to grind or cut the seat in the body. Once the custom tool is made the seat needs to be ground or cut, this could take anywhere from an hour to ten hours depending on the seat damage. In addition the plug needs to be set up in a lathe and the seating surface of the plug machined. All of this grinding and machining of the plug and seat ring surfaces reduces the Stellite (Hard Face) thickness which is approximately ⅛" thick, in turn reduces the life of the valve. In some cases, when a prior art globe valve is disassembled, the damage is so bad that the valve needs to be replaced and the decision to replace the valve adds even more time and cost to the customer, which includes hiring another contactor to cut and weld the new valve in and finding someone to modify the replacement valve to accept the current actuator that is installed on the old valve. Because the seat ring and plug can be replaced in the valve assembly disclosed herein, the seating surfaces are in new condition every time the valve assembly gets repaired. Time and cost are very important to customers, so the cost and time to fix the currently designed prior art valves is very time consuming and expensive. To replace the seat and plug on the valve disclosed herein takes approximately 30 minutes compared to prior art valves' 2 hrs-10 hrs. This time does not even account for travel to a machine shop needed with prior art valves. In addition most valves have actuators on them, actuators are pneumatic, hydraulic or electric and they are used to remotely open and close a valve. Because all globe valve manufactures sell their valves with a hand wheel (manually operated) as a standard for these valves, modifying a manual valve is expensive and time consuming. It requires a specialty shop to design, manufacture and alter the current prior art valves to accept an actuator which can vary in design based on the actuator size and type. The valve assembly disclosed herein includes a common mounting flange, if a specialty mounting flange is needed the customer just needs to bolt a new one to the valve verses having a company design, machine and weld this mounting flange to the current prior art globe valves manufactured in the market. Again, significant time and cost savings result from the valve assembly disclosed herein. Lastly, the valve assembly disclosed herein does not include sub-assemblies so if one part is bad that is all that needs to be replaced and not an expensive assembly.

Further disclosed herein is a customized case for the storage, organizing, and transporting of parts. An exemplary case is at least one of waterproof, lockable, and formed of hard plastic. In an exemplary embodiment, the case can be labelled on the outside to identify the valve and the location of the valve for replacement. In an exemplary embodiment, the case is retrofit with rigid foam cut outs to fit the valve parts inside. This customizable retrofit feature is particularly important in that parts may differ from job to job depending on the valve job. The case prevents damage, organizes the parts and customers know that they will have what they need.

In an exemplary embodiment, the case holds the valve parts and accessory parts such as, for example and not inclusive of, rubber and plastic seals, seat rings and plugs.

A case is necessary in the valve industry for organization and efficiency. Traditionally, the parts are randomly thrown in crates wrapped in duct tape. The crates and parts often get damaged while in transit. Additionally, the duct tape is difficult to remove and unnecessary time is spent in sorting the parts and assessing whether all of the parts are intact and ready for use.

Figure 8:
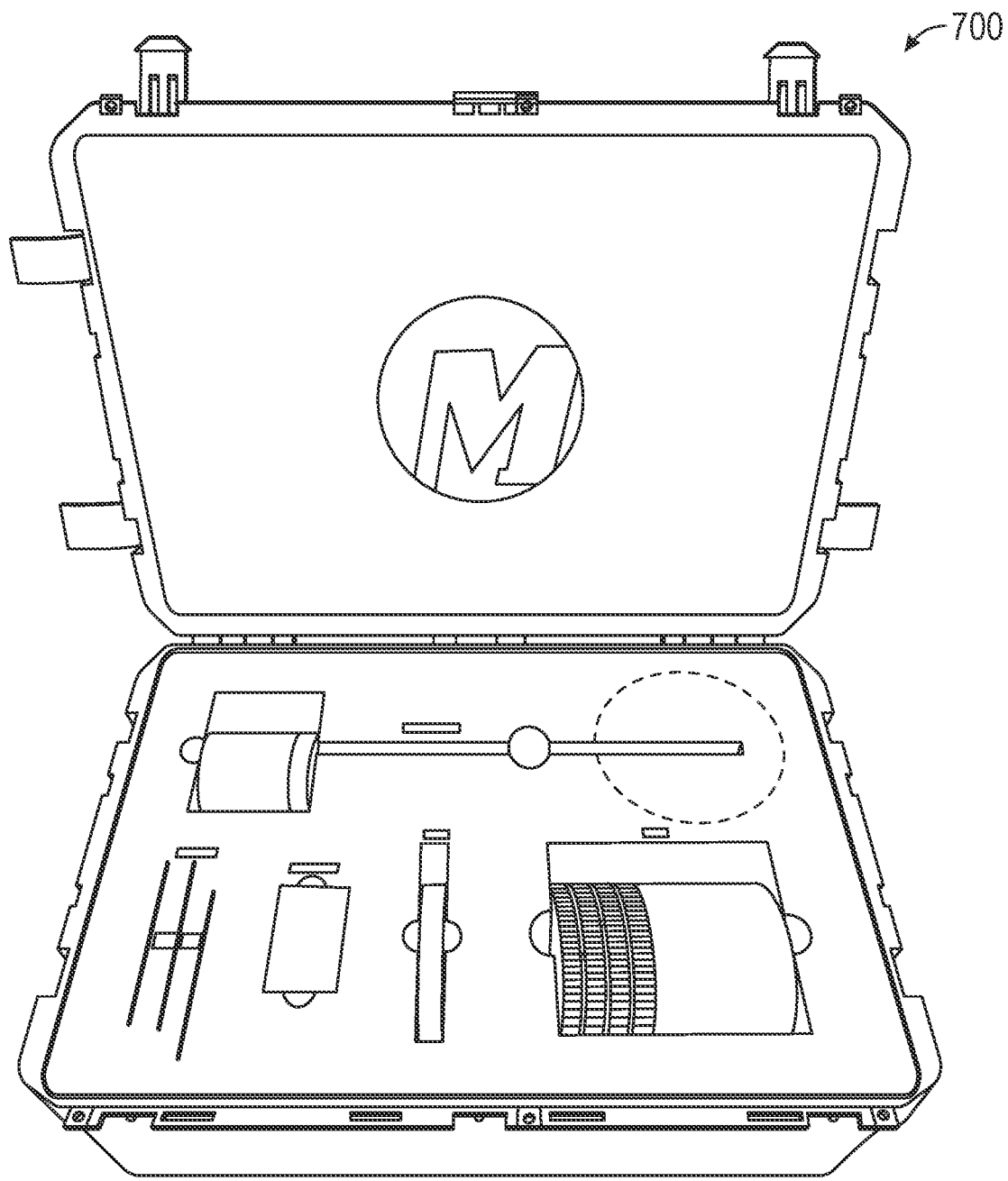
FIG. 8 is a schematic depicting an exemplary case for storing, organizing, and transporting parts of an exemplary globe valve assembly.

An exemplary case 700 is depicted in FIG. 8.

The use of the terms "a" and "an" and "the" and similar referents in the context of describing the invention (especially in the context of the following claims) are to be construed to cover both the singular and the plural, unless otherwise indicated herein or clearly contradicted by context. The conjunction "or" when used with a list of at least two terms is intended to mean any term or combination of terms. Further, it should be noted that the terms "first," "second," and the like herein do not denote any order, quantity, or importance, but rather are used to distinguish one element from another. The terms "including" and "having" and the like are intended to be inclusive such that there may be additional elements other than the elements listed. The term "configured" relates one or more structural limitations of a device that are required for the device to perform the function or operation for which the device is configured. The terms "about", "substantially" and "generally" are intended to include a non-significant degree of variation or a degree of error associated with measurement of the particular quantity based upon the equipment available at the time of filing the application. For example, "about" and/or "substantially" and/or "generally" can include a range of ±5% of a given value.

The disclosure illustratively disclosed herein may be practiced in the absence of any element which is not specifically disclosed herein.

The teachings of the present disclosure may be used in a variety of industrial operations. These operations may involve controlling the flow of a fluid or substance through a pipe or conduit. The fluid or substance may be in the form of a liquid, gas, semi-solids, and mixtures thereof. The chemical composition of the fluid or substance being controlled is generally compatible with the material or materials used in the globe valve assembly that are in contact with the fluid or substance at the operational temperature and/or pressure of the fluid or substance.

The invention has been described with reference to certain preferred embodiments. However, the invention is not to be so limited to such disclosure, but encompasses all variations and modifications that would be apparent to one of ordinary skill in the art at the time of the invention.

What is claimed:

1. A valve assembly for controlling a flow of a substance through the valve assembly, the valve assembly comprising:
    a valve body defining an inlet, an outlet, and a volume therebetween;
    a sleeve disposed in at least a portion of the volume, an interior of the sleeve having a first opening in fluid communication with the inlet and a second opening in communication with the outlet;
    a seat ring releasably held in place in the valve body by pressure exerted by a lower end of the sleeve at at least one of the first opening or the second opening without the seat ring being secured by a mechanical fastener to the valve body;
    a stem disposed in the sleeve;
    a plug releasably engaged to the stem and configured to contact the seat ring to control the flow of the substance through the valve assembly;
    an actuating subassembly that receives the stem and comprising a lower mounting flange having a lower mounting flange body that is threaded into the valve body; and
    a dowel inserted in a wall of the sleeve at an upper end and in the lower mounting flange body to align the sleeve in the valve body.

2. The valve assembly according to claim 1, wherein the seat ring is releasably held in place in the valve body by direct contact of the sleeve pushing on the seat ring.

3. The valve assembly according to claim 1, further comprising a seal disposed between the seat ring and a component opposite of the sleeve such that the direct contact pushing on the seat ring compresses the seal to seal the seat ring to the component.

4. The valve assembly according to claim 3, wherein the component is one of the valve body or a lower portion of the sleeve.

5. The valve assembly according to claim 1, wherein the sleeve is held in place by contact with the lower mounting flange.

6. The valve assembly according to claim 5, wherein the sleeve is secured to the mounting flange by one or more dowels.

7. The valve assembly according to claim 1, wherein the plug is not held in place by a mechanical fastener.

8. The valve assembly according to claim 1, wherein the stem comprises a shoulder abutting a cylindrical recess and the plug comprises a substantially inverted T-shaped opening centrally formed through a topside of the plug such that the shoulder engages a T-portion of the inverted T-shaped opening to couple the plug to the stem.

9. The valve assembly according to claim 8, wherein the plug is released from the stem by sliding the plug horizontally from the stem with the stem in a vertical orientation.

10. The valve assembly according to claim 1, wherein the plug is not secured to the stem by a mechanical fastener.

11. The valve assembly according to claim 1, further comprising a motive interface coupled to the stem to apply rotational power to the stem, the motive interface comprising at least one of a handle and a motor.

12. An accessory kit for the valve assembly according to claim 1, the accessory kit comprising a hard-sided case having foam cut-outs for at least one or more seat rings and one or more plugs and, optionally, one or more seals disposed therein.

13. A method for controlling a flow of a substance through a valve assembly, the method comprising:
    flowing the substance through the valve assembly, the valve assembly comprising: a valve body defining an inlet, an outlet, and a volume therebetween; a sleeve disposed in at least a portion of the volume, an interior of the sleeve having a first opening in fluid communication with the inlet and a second opening in communication with the outlet; a seat ring releasably held in place in the valve body by pressure exerted by a lower end of the sleeve at at least one of the first opening or the second opening without the seat ring being secured by a mechanical fastener to the valve body; a stem disposed in the sleeve; and a plug releasably engaged to the stem and configured to contact the seat ring; an actuating subassembly that receives the stem and comprising a lower mounting flange having a lower mounting flange body that is threaded into the valve body; and a dowel inserted in a wall of the sleeve at an upper end and in the lower mounting flange body to align the sleeve in the valve body; and
    at least one of: (i) rotating the stem in one direction to force the plug against the seat ring to stop the flow of the substance through the valve assembly or (ii) rotating the stem in an opposite direction to unseat the plug from the seat ring to allow the flow of the substance through the valve assembly.

14. The method according to claim 13, further comprising:
    removing the lower mounting flange body from the valve body;
    removing the sleeve from the valve body and pressure on the seat ring;
    removing the seat ring;
    replacing the seat ring with a new seat ring;
    inserting the sleeve in the valve body to hold the seat ring in place; and
    replacing the lower mounting flange body in the valve body to apply pressure on the new seat ring.

15. The method according to claim 14, further wherein removing the seat ring comprises removing a seal underneath the seat ring and replacing the seat ring comprises replacing the seal with a new seal.

16. The method according to claim 14, wherein removing the seat ring does not require removal of a mechanical fastener securing the seat ring to the sleeve.

17. The method according to claim 13, further comprising:
    removing the stem from the valve body;
    sliding the plug off the stem;
    sliding a new plug onto the stem; and
    inserting the stem in the valve body.

18. The method according to claim 17, wherein sliding the plug off the stem does not require removal of a mechanical fastener securing the plug to the stem.

* * * * *